United States Patent [19]

Amicel et al.

[11] 4,203,844
[45] May 20, 1980

[54] HOLLOW FIBER APPARATUS FOR THE FRACTIONATION OF FLUID ESPECIALLY USEFUL AS AN ARTIFICIAL KIDNEY

[75] Inventors: Charles Amicel, Carrieres sur Seine; Bernard Biot, Craponne; Yves Butruille, Ferrolles-Attilly; Christian Ollivier, Vienne, all of France

[73] Assignee: Sodip SA, Meyzieu, France

[21] Appl. No.: 834,997

[22] Filed: Sep. 20, 1977

[30] Foreign Application Priority Data

Oct. 5, 1976 [FR] France ................ 76 30673

[51] Int. Cl.² ............................. B01D 13/04
[52] U.S. Cl. ............... 210/321 B; 55/158 R
[58] Field of Search ......... 210/321 R, 321 A, 321 B; 55/158

[56] References Cited

U.S. PATENT DOCUMENTS

| | | | |
|---|---|---|---|
| 3,339,341 | 9/1967 | Maxwell et al. | 55/16 |
| 3,367,505 | 2/1968 | Bray | 210/321 R |
| 3,503,515 | 3/1970 | Tomsic | 210/321 R |
| 3,547,272 | 12/1970 | Fanwood et al. | 210/321 R |
| 3,674,628 | 7/1972 | Fabre | 210/321 R |
| 3,882,024 | 5/1975 | Holmes | 210/321 R |
| 4,031,012 | 6/1977 | Geis | 55/158 |
| 4,033,723 | 7/1977 | Gibner | 210/321 A |
| 4,038,190 | 7/1977 | Baudet et al. | 210/321 A |

Primary Examiner—John Adee
Attorney, Agent, or Firm—Gerald D. Sharkin; Robert S. Honor; Walter F. Jewell

[57] ABSTRACT

Hollow fiber apparatus for the fractionation of fluid, especially useful as an artificial kidney, is disclosed, characterized principally in that it comprises:

a mandrel in the form of a truncated cone towards the ends of which two so-called end walls are situated, which surround the said mandrel and by which hollow fibers are held, the fibers extending from one end wall to the other, at least one of the end walls being sealed and traversed by the open ends of the hollow fibers, an outer casing of which the inner wall is in the form of a truncated cone at least along the greater part of its length near the hollow fibers, means for the intake and/or discharge of the fluid which circulates inside the hollow fibers, and means for the intake and/or discharge for the fluid which circulates over the outer wall of the fibers.

Process and apparatus for manufacturing the hollow fiber apparatus are also disclosed.

11 Claims, 9 Drawing Figures

HOLLOW FIBER APPARATUS FOR THE FRACTIONATION OF FLUID ESPECIALLY USEFUL AS AN ARTIFICIAL KIDNEY

The present invention relates to a hollow fiber apparatus which can be used for the fractionation of fluid, especially for the treatment of blood, in which the fluid which is on the outside of the fibers circulates over substantially the whole length of the enclosure in which the fibers are situated.

The present invention also relates to a process and equipment for the production of the said hollow fiber apparatus.

Known apparatuses for the purpose generally contain a bundle of hollow fibers which are approximately parallel to each other and have, at each of their open ends, a quantity of solidified glue which is used to separate the fluid circulating inside the fibers from the fluid circulating outside, the said fibers being surrounded by the cylindrical inner wall of a casing. When apparatuses are used for exchange operations, such as, for example, haemodialysis, the fibers are embedded at each of their opposite ends in a so-called leak-proof end wall, which most often comprises solidified glue, and the two opposite ends of the fibers are open in order that a fluid can enter through one end of the fibers and leave again through the opposite end of the same fibers. When these apparatuses are used for separation operations, for example in ultrafiltration or reverse osmosis, the hollow fibers can either be arranged as described above between two leak-proof end walls, at least one of the ends of the fibers being open, or they may be arranged as a U, the ends of the fibers then all being in the same leak-proof end wall and open at their ends.

For high efficiency of these apparatuses, that is to say in order for the fractionation to be as thorough as possible, it is necessary for all the fibers to be equally irrigated by the fluid which is circulating over their outer wall. In fact, if the fluid outside the fibers circulates along preferential routes rather than uniformly, some regions of fibers will then be less well irrigated by this fluid and the efficiency of the apparatus will be lower. When producing these apparatuses, the aim is therefore to maintain the fibers at a regular distance from each other and also to insure that the fluid outside the fibers does not pass preferentially between the peripheral fibers of the bundle and the inner wall of the casing which surrounds the said bundle of fibers, and therefore without irrigating the hollow fibers at the center of the bundle.

Various solutions have been put forward for avoiding the presence of preferential routes for the fluid which circulates outside the fibers, it being generally recognized that it is not easy to prepare industrially a bundle of hollow fibers and to slide the bundle inside a casing, of which the diameter of the inner wall is smaller than the external diameter of the bundle before the latter is introduced, because there is a risk of damaging the peripheral fibers of the bundle and even of lengthening and stretching out the fibers.

One solution which has been put forward, when a casing which is in a single piece is used, consists in arranging a flexible sheath around the bundle before its introduction into the enclosure. The presence of the sheath thus protects the peripheral fibers of the bundle when it is introduced into the casing. This procedure therefore requires an auxiliary sheath which must itself be chosen and designed in such a way that it does not damage the peripheral fibers of the bundle when it is placed around the latter. For that purpose, this sheath is advantageously designed in such a way that it has an internal diameter which is greater than that of the bundle before it is placed around the latter as well as in such a way that its transverse peripheral dimension can retract in order to produce a tightening effect on the bundle when it is subjected to a longitudinal tension (compare U.S. Pat. No. 3,339,341). However, this solution has the disadvantage of making the manufacture of the bundle, and as a result that of the apparatus, rather long and therefore of no economic value, especially in the manufacture of apparatuses which are mass produced and cheap.

When the casing which surrounds the bundle of fibers is in a single piece, another solution, known from the prior art, consists in introducing into the apparatus, on the outside of the fibers, a filling product such as judiciously chosen inert particles (compare U.S. Pat. No. 3,503,515), this being carried out after placing into the casing a bundle of which the diameter is smaller than the internal diameter of the casing. However, this solution is not easy to put into practice and it is difficult to avoid entraining these particles when the apparatus is functioning. Moreover, this solution, as well as that of the previously mentioned U.S. Pat. No. 3,339,341, has the disadvantage of placing the fluid, which circulates outside the fibers, in contact with an extra element (sheath or particles), and this in turn necessitates that the material of which this extra body is made be compatible with this fluid, this being all the more important when the fluid which circulates outside the fibers is blood.

It is also known from the prior art to produce hollow fiber apparatuses by arranging two essentially identical half-shells around a bundle of fibers which are parallel to each other. However, it is necessary with this solution to take precautions in order not to pinch the fibers when the half-shells are placed together and this solution thereafter necessitates that a seal be produced along the whole length of the envelope in two places.

One aim of the present invention is therefore a hollow fiber apparatus which does not have the disadvantages of the apparatuses of the prior art, and in which there is practically no preferential route for the fluid which circulates outside the fibers and in which it is easy to arrange the casing around the hollow fibers.

A hollow fiber apparatus has now been found for the fractionation of fluid which is especially useful as an artificial kidney, and it is to this that the present invention relates. The apparatus is characterized generally in that it comprises a mandrel 1 in the form of a truncated cone towards the ends of which two so-called end walls 2 are situated, which surround the said mandrel 1 and by which hollow fibers 3 are held, the fibers extending from one end wall to the other, at least one of the end walls 2 being sealed and traversed by the open ends of the hollow fibers, an outer casing 6 of which the inner wall 11 is in the form of a truncated cone at least along the greater part of its length near the hollow fibers, means for the intake and/or discharge for the fluid which circulates inside the hollow fibers, and means for the intake and/or discharge for the fluid circulating over the outer wall of the fibers.

The present invention also relates to a process, and an improved equipment, for the production of the apparatus according to the present invention.

The term "fractionation" used above encompasses any exchange or transfer of matter (or even of calories) by which, after intervention of the said fractionation, one or several fluids are obtained which do not have the same composition or the same properties as the fluid (or fluids) which is (or are) introduced into the hollow fiber apparatus. The fractionation operations which are envisaged are therefore essentially: exchange operations (dialysis, for example an artificial kidney, direct osmosis, gas-gas exchange, gas-liquid exchange, for example an artificial lung), separation operations (ultrafiltration, reverse osmosis, gas permeation), and even mixing operations. But the hollow fiber apparatus according to the present invention can also be used in operations such as heat exchange between two fluids, the humidification and/or conditioning of air, the dissolution of certain gases in liquids, and the like.

In the apparatus according to the present invention, the expression "hollow fibers" denotes fibers of tubular form, that is to say fibers inside which there is a continuous passage which is arranged essentially along the axis of the fiber. The hollow fibers which can be used may be of any known type and made of any natural, artificial or synthetic macromolecular material. In particular, the fibers mentioned in French Pat. Nos. 1,307,979; 1,586,563; 2,017,387; and U.S. Pat. No. 3,674,628 can be used. These fibers can be obtained by a dry process (evaporation of solvent) or by a wet process (coagulation). The precise nature of the hollow fibers is chosen as a function of the particular application which is envisaged and naturally, for operations of simple heat exchange, the hollow fibers used will be impermeable to the fluids which circulate on their outer or inner walls and will be made of materials such as those described especially in U.S. Pat. No. 3,315,740.

The hollow fibers which can be used in the apparatus according to the present invention have an external diameter which is generally less than 1.5 mm, preferably less than 0.75 mm and generally greater than 5 microns. When the apparatus is used as a haemodialyser or as an artificial lung, the external diameter of the fibers is preferably greater than 300 microns. The wall thickness of the fibers is generally between 1 and 100 microns.

The description of the apparatus according to the present invention will be still better understood with the aid of the attached figures which illustrate schematically, by way of nonlimiting examples, and without a fixed scale, some particularly desirable embodiments of the apparatus.

Figure 1:
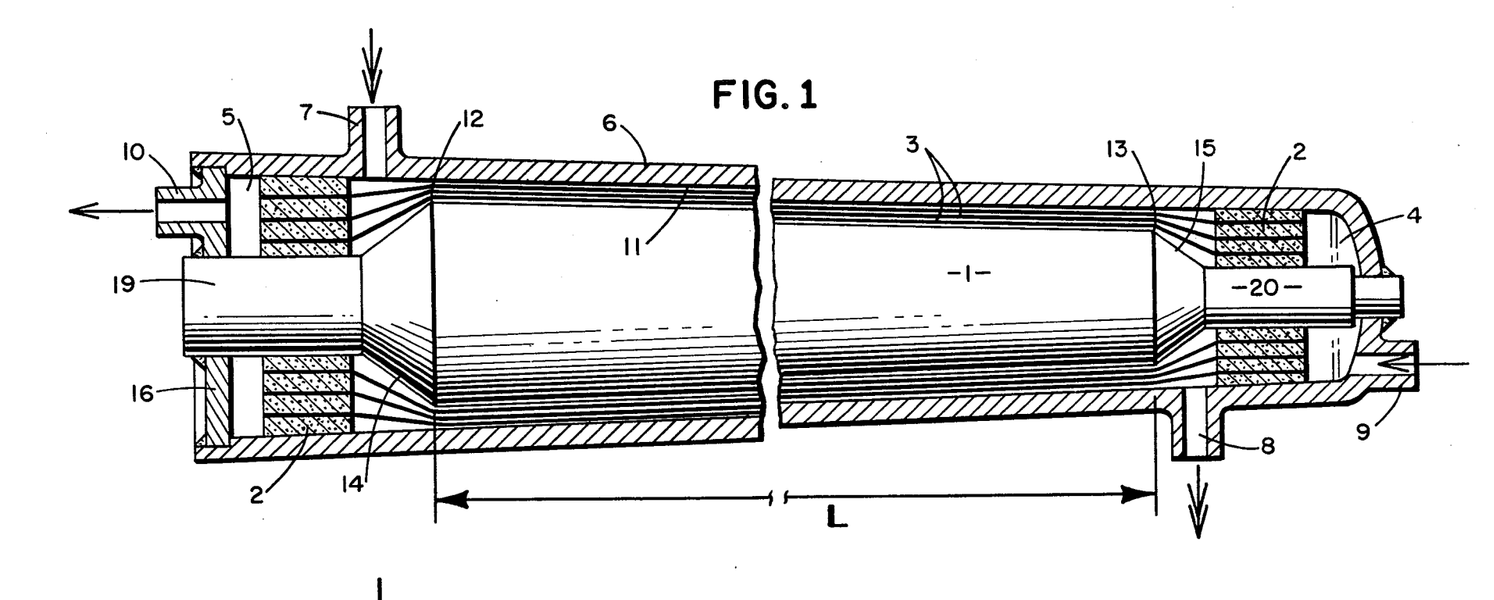
FIG. 1 represents the cross-section of an apparatus along its longitudinal axis.

The apparatus according to FIG. 1 comprises a mandrel 1 and two leak-proof end walls 2 in which the terminal regions of the fibers 3 are embedded, these fibers extending from one end wall to the other. The fibers 3 are in contact with each other and can advantageously be in the form of torsades, placed next to each other, such as those described in French Pat. Nos. 73/20,040 and 74/11,674. Each torsade of hollow fibers preferentially comprises two fibers or comprises itself two torsades of two fibers which are wound around each other. Each end of the fibers 3 is open and comes out into a compartment 4 or 5, which comprises means 9, 10 for the introduction or the discharge of a fluid inside the hollow fibers 3. A casing 6 is situated around the fibers, this casing comprising means 7, 8 for the introduction and the discharge of a fluid flowing over the outer wall of the hollow fibers 3. The special characteristic of this apparatus arises from the fact that the mandrel 1 is in the form of a truncated cone along the greater part of its length between the sealing walls 2 and that the inner wall 11 of the casing is similarly in the form of a truncated cone, at least in the part which is opposite to the part L, which is in the form of a truncated cone, of the mandrel.

As is the case for the apparatus according to FIG. 1, the ends 19 and 20 of the mandrel around which the annular leakproof end walls 2 are situated, can have a diameter which is smaller than the diameter of the smaller cross-section of the length L, which is in the form of a truncated cone, of the mandrel. The end 19 of the mandrel which is close to the part L, which is in the form of a truncated cone, of the mandrel 1 of greater diameter, therefore has a diameter which is greater than the diameter of the end 20 of the mandrel which is close to the part L, which is in the form of a truncated cone, of the mandrel of smaller diameter.

The joining of the ends 12 and 13 of the part L, which is in the form of a truncated cone, of the mandrel with the ends 19 and 20 of the mandrel around which the leak-proof end walls 2 are situated, is effected by a progressive decrease in the cross-section of the mandrel in the regions denoted by 14 and 15.

The ends 19 and 20 of the mandrel 1 around which the walls 2 are situated are advantageously cylindrical, but, for example, their cross-section can also decrease progressively as the compartments 4 and 5 are approached.

The leak-proof end walls 2 generally comprise a ribbon which is wound in a spiral around the ends 19 and 20 of the mandrel, the hollow fibers 3 being arranged with glue between the turns of the ribbon.

As has been stated above, the inner wall 11 of the casing 6 is in the form of a truncated cone at least in the part which is opposite to the length L, which is in the form of a truncated cone, of the mandrel. The conicities of the length L of the mandrel and the inner wall 11 of the casing 6 are advantageously slightly different, so that a cross-section for the passage of the fibers 3 is preserved, which cross-section is essentially the same along the whole length L, which is in the form of a truncated cone, of the mandrel.

In the case of the apparatus in FIG. 1, the leak-proof end walls 2 are in contact with the inner wall 11 of the casing 6 whilst this wall 11 is cylindrical at these points. This permits, for example, the assembly of the mandrel 1, hollow fibers 3, and end walls 2 to be introduced into the casing 6 and then a tightening at a desired pressure, of the hollow fibers 3 against the inner wall 11 of the casing 6 to be carried out.

After the mandrel and the casing have been affixed to each other, it may then be preferred to inject glue onto the periphery of the end walls 2 by means of holes provided through the casing 6, as will be described later for the subsequent figures.

The apparatus in FIG. 1 has been represented with a single end cheek or wall 16, but it can contain one at each end. On the other hand, the means which hold the different elements together (mandrel, cheek or end wall, casing), or which insure the seal between these elements, have for the sake of simplicity not been represented, since they are all known per se to those skilled in the art and do not constitute a part of the invention.

For the operation of the apparatus according to FIG. 1, for example as a dialyser, a fluid is introduced inside the fibers through the inlet 9 and this fluid leaves the apparatus through the outlet 10, after having circulated in the fibers. It is of course equally possible to introduce this fluid into the bundle of fibers via 10 and to cause it to leave again via 9.

The fluid which circulates outside the fibers is introduced into the apparatus through the inlet 7 and leaves the apparatus again through the outlet 8, or vice versa, after having traversed essentially the whole length of the enclosure which is defined by the mandrel 1, the inner wall 11 of the casing 6, and the end walls 2.

Close to the openings through which the fluid which circulates inside the fibers arrives or leaves, there is an arrow with one chevron, whereas an arrow with two chevrons is shown for the openings which are used for the fluid which circulates outside the fibers, this same convention being observed for the remaining apparatuses which will be referred to below.

The operation of the apparatus according to FIG. 1 as a dialyser has been described, but this apparatus can equally be used for separation operations, that is to say operations such as, especially, ultrafiltration, reverse osmosis, or permeation, in which a fluid, which is introduced into the apparatus, is divided into two fractions: one fraction has not traversed the membranes (the hollow fibers) and is depleted with respect to the constituent (or constituents) of the initial fluid which has traversed the membranes, whereas the other fraction which has traversed the membranes is enriched with respect to this constituent (or constituents) of the initial fluid. It is thus possible advantageously to introduce a fluid under pressure into the apparatus through the inlet 7 and recover the fraction of the fluid which has not traversed the hollow fibers through the outlet 8, or vice versa, whereas the fraction of the fluid which has traversed the membranes is recovered through the ports 9 and 10. By "traverse" in this context, of course, is meant permeation or flow through the walls of the hollow fibers which function as membranes.

Figure 2:
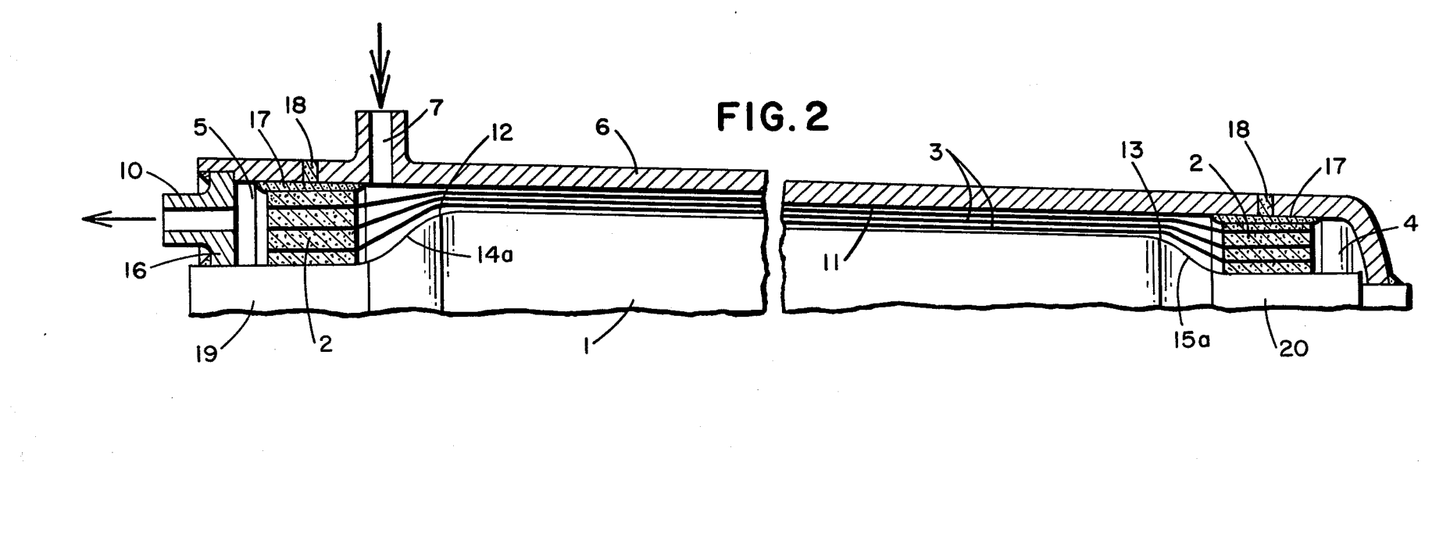
FIG. 2 represents the half cross-section of an embodiment of the apparatus along its longitudinal axis.

FIG. 2 represents a variant of the apparatus according to FIG. 1. In this apparatus, the inner wall 11 of the casing 6 is in the form of a truncated cone along its whole length up to the end wall or cheek 16. In addition, the regions 14 and 15, of the mandrel and through which the ends 12 and 13 of the length L, which is the form of a truncated cone, of the mandrel join to the ends 19 and 20 which are advantageously cylindrical have a different configuration from that of the regions 14 and 15 of the apparatus according to FIG. 1; in fact in cross-section the regions 14 and 15 of the apparatus according to FIG. 2 form a curve.

The leak-proof end walls 2 each comprise a portion 17 of glue which is applied to their periphery through regularly spaced openings 18 around the casing 6, for example in a plane which is essentially perpendicular to the axis of this casing towards each leak-proof end wall 2.

After the assembly "mandrel 1, hollow fibers 3 and end walls 2" has been introduced into the casing and tightened, for example to the desired pressure, these openings 18 permit the introduction of the glue onto the periphery of the leak-proof end walls 2 and thus produce an effective sealing together of the leak-proof end walls 2 and the inner wall 11 of the casing 6, by means of the extra thickness 17 of the applied glue.

However, with the apparatus according to FIG. 2, it is possible, by way of a variant, to introduce into the casing 6 an assembly "mandrel 1, hollow fibers 3 and end walls 2", of which the said walls 2 already have the conicity of the internal wall 11 of the casing, this conicity being obtained, for example, by molding onto these walls 2 and thus conforming the surfaces thereof that are in contact with each other.

Figure 3:
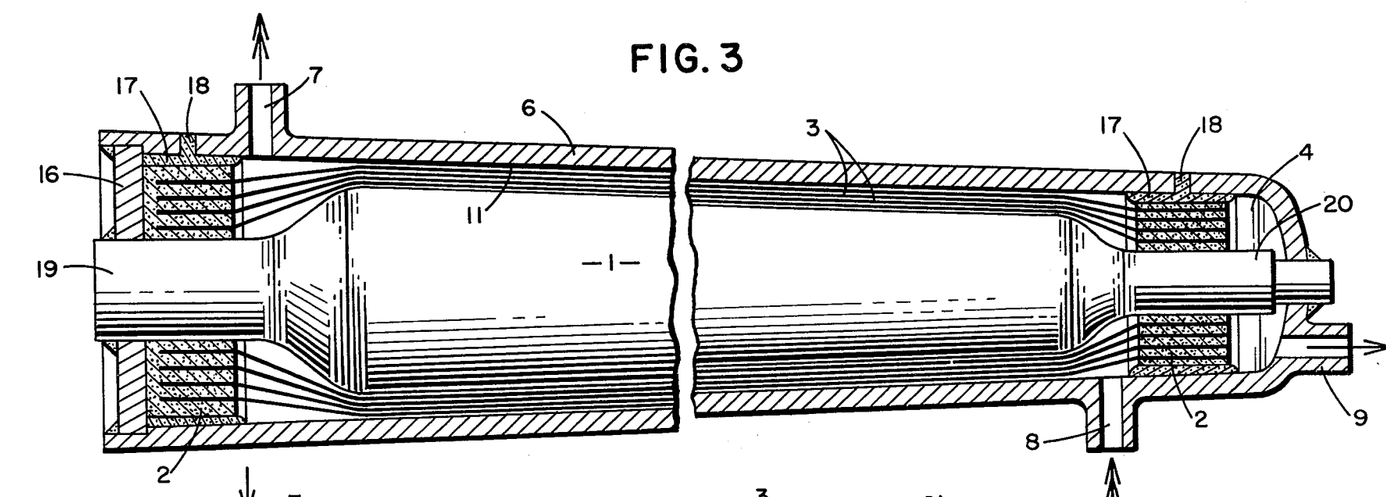
FIG. 3 represents an apparatus which can be used more especially for separation operations.

FIG. 3 represents another form of an apparatus according to the present invention, of which the internal wall 11 of the casing 6 is in the form of a truncated cone along its whole length. This apparatus is more especially designed for separation operations and it comprises only one port or outlet 9 for the discharge of the fluid which has traversed the hollow fibers 3, the fluid circulating outside the fibers passing through ports 7 and 8. The hollow fibers 3 are open at their ends which communicate with the compartment 4 for the recuperation of the fluid which has traversed the hollow fibers 3. When the ends of a fiber are located in both of the end walls 2, it is preferable in accordance with this embodiment that only the end which communiates with the compartment 4 be open.

In the apparatus according to FIG. 3 the hollow fibers 3 may, on the other hand, be arranged in the form of a U, the two open ends of which open into the compartment 4, whereas the bend of the U is situated in the wall 2 on the left of the apparatus. It should be noted that the end wall 2 which is on the left of the apparatus in the case of FIG. 3, does not need to be leak-proof when the end of each of the fibers is closed at this point or when the bend of each U-shaped fiber is situated in the wall 2 at this point. The only function of this wall 2, which is on the left of the apparatus, is therefore to hold the hollow fibers, especially when they are placed around the mandrel.

Figure 9:
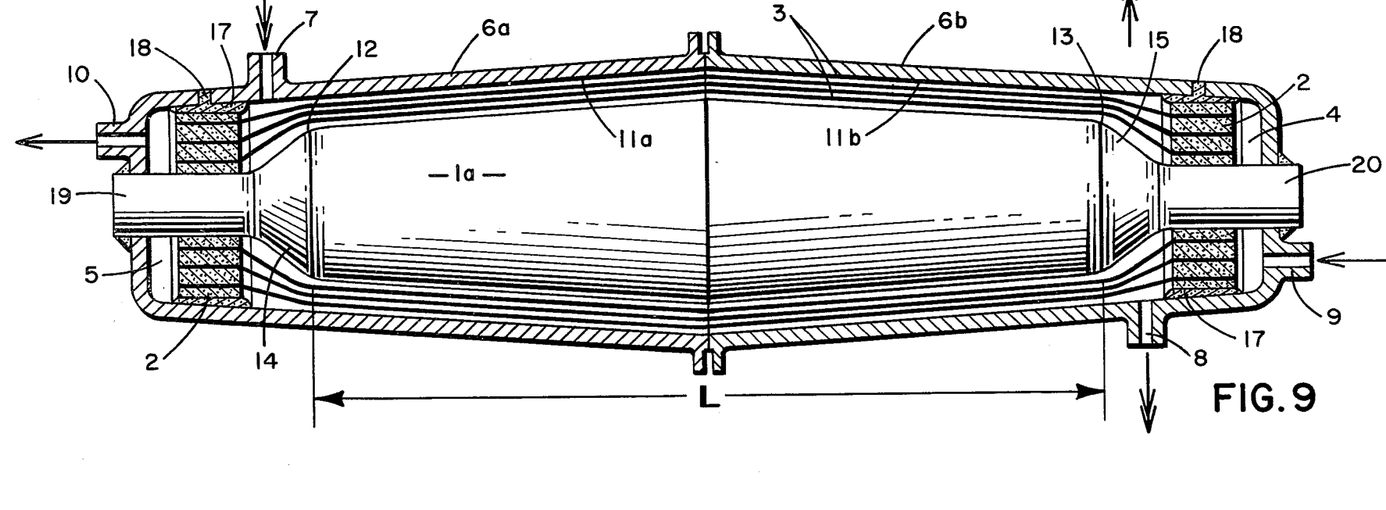
FIG. 9 is another embodiment of an apparatus according to the present invention.

FIG. 9 represents still another embodiment of an apparatus according to the present invention, in which the mandrel 1 is in the form of a double truncated cone along its length L which is situated between the points represented as 12 and 13, and comprising a casing with two elements 6a and 6b, which are sealed together in a substantially centrally located plane which is perpendicular to the longiitudinal axis of the mandrel 1, each element 6a and 6b having its inner wall 11a or 11b which is in the form of a truncated cone.

As in the previously described apparatuses, the conicities of the mandrel 1 and of the inner wall 11a or 11b of the element 6a or 6b of the casing which is opposite to it, are advantageously different from each other, and these conicities are preferably such that the cross-section of the passage for the fibers 3 is essentially the same along the whole length L, which also is in the form of a double truncated cone, of the mandrel 1. An advantage of the apparatus according to FIG. 9, relative to the apparatuses according to FIGS. 1 to 3 described above, resides in the fact that it can be made symmetrical with respect to a plane which is perpendicular to the longitudinal axis of the mandrel, and this leads especially to a reduction in the number of molds for the components which have to be injected, for example when the mandrel comprises essentially cylindrical 19 and 20 components towards its ends.

An essential advantage of the previously described apparatuses according to FIGS. 1 to 3 and 9, relative to the apparatuses heretofore known in the prior art, resides in the great ease with which it is possible to place the casing (which optionally is in two parts) around, and in contact with, the hollow fibers 3, without risk of damaging the latter. In fact, when assembling the apparatus the contact between the fibers 3 and the inner wall 11 of the casing is only over a short distance, when the mandrel or the casing slides over the fibers, by virtue of their relative conicity. On the other hand, in the apparatuses according to the present invention, there are virtually no preferential paths for fluid between the inner wall 11, which is in the form of a truncated cone, of the casing and the outer hollow fibers at their point of contact or between the hollow fibers themselves, particularly when the latter are in the form of torsades. There are thus fewer if any regions of fibers which are better irrigated than others on their outer wall, since the fibers are regularly tightened against each other between the whole length L, which is in the form of a truncated cone, of the mandrel 1 and the inner wall 11, 11a, 11 b of the casing 6, 6a, 6b, it being possible for these to have a profile which favors turbulence. Thus, what might be called "short-circuiting" of the flow of fluid undergoing processing through the apparatus is substantially completely avoided.

Numerous other embodiments of the apparatus according to the present invention will readily occur to those skilled in the art. By way of examples which are not illustrated, the mandrel can comprise several parts which are joined together, it can be hollow on the inside, it can have its ends 19 and 20 separately applied, and the like. It should also be pointed out that, although this is not an especially preferred embodiment of the apparatus, the transverse cross-sections of the mandrel, which is in the form of a truncated (or double truncated) cone, can be of a shape which is other than a circular, as also may be the ends 19 and 20 which support the end walls 2. Moreover, an apparatus is still within the scope of the present invention provided that the mandrel is in the form of a truncated (or double truncated) cone along at least 70% of its length between the two end walls which hold the fibers, and provided further that the inner wall of the casing (which is in two elements in the case of a mandrel in the form of a double truncated cone) is likewise in the form of a truncated cone along at least the greater part of its length which is opposite to the length L, in the form of a truncated cone, of the mandrel.

A process and equipment for producing hollow fiber apparatuses according to the present invention have been described in French Application Nos. 76/14,862 and 76/14,864, corresponding respectively to our copending U.S. applications Ser. Nos. 790,996 and 791,023, both filed Apr. 26, 1977. The equipment which is described and illustrated in FIGS. 5 to 10 of French Application No. 76/14,862 and the equipment which is described and illustrated in FIGS. 6 to 8 of French Application No. 76/14,864 are particularly advantageous for the production of hollow fiber apparatuses according to the present invention. The disclosures of those applications are incorporated herein by reference. These apparatuses and the corresponding processes are especially suitable for the production of hollow fiber apparatuses in which the mandrel has a profile such that the ends, on which the walls 2 which hold the fibers are formed, have diameters which are different from each other. In fact, the threaded screws with which those applications are especially concerned and which are used to entrain the hollow fibers up to the mandrels, can have a profile such that the fibers, while being entrained by the threaded screws, can adjust to the changes in transverse cross-section of the mandrel.

However, it has been found to be particularly advantageous, especially when a mandrel has large variations in transverse cross-sections along a short length, which is the case especially at the points represented by 14 and 15 for the mandrel of the hollow fiber apparatus according to the present invention, and while retaining threaded screws or equivalent means for moving the hollow fibers, to have at least one intermediate component which will be denoted as an "extension ramp", or more simply "ramp" in the continuation of the description, on which the fibers rest, which fibers form the envelope of polygonal cross-section which is mentioned in French Application No. 76/14,864 or form the turns which are mentioned in French Application No. 76/14,862. With the presence of this (or these) ramp (or ramps), the threaded screws can thus be, for example, cylindrical along their whole length, and this renders their manufacture easier. The extensions which must be provided on the hollow fiber envelope of polygonal cross-section or on the turns of hollow fibers, so that the said hollow fibers are arranged around the longitudinal profile of the mandrel, will be obtained from the shape of this (or these) ramp (or ramps), of which further details are to be found below.

Figure 4:
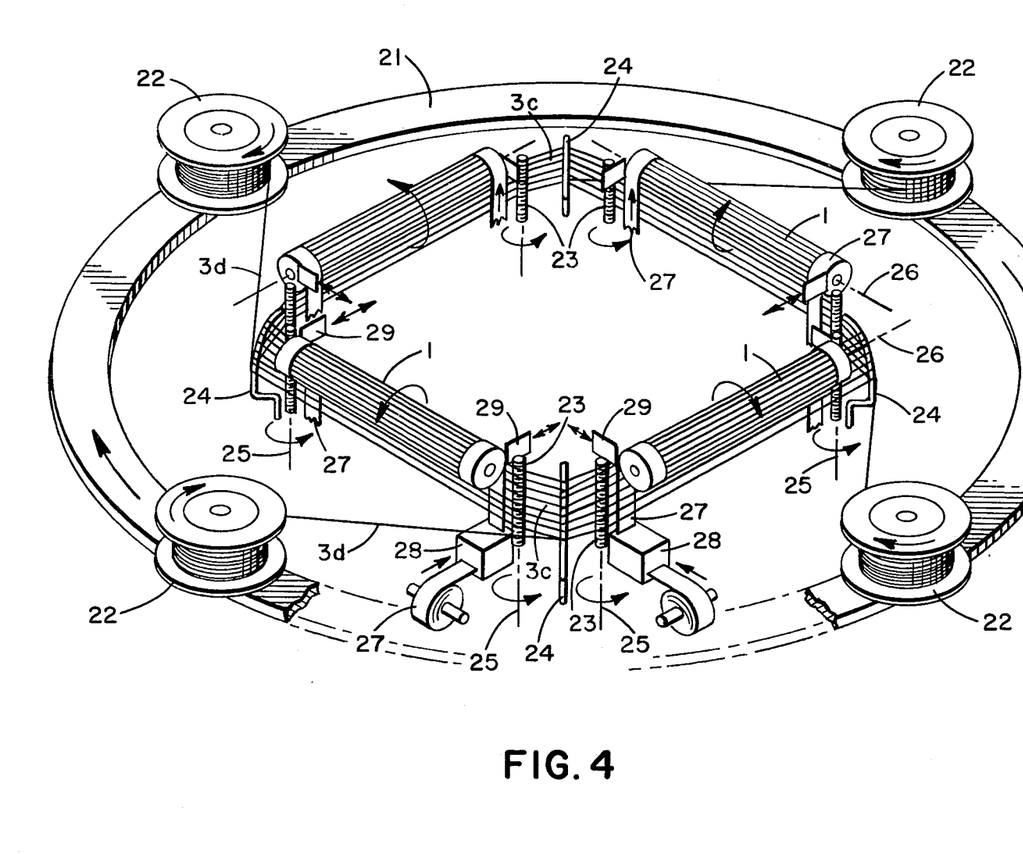
FIG. 4 is a view in perspective of equipment for producing a hollow fiber apparatus according to the present invention.

FIG. 4 represents in perspective an equipment for the manufacture of hollow fiber apparatuses according to the present invention, this equipment being fitted with the "extension ramps" 24 which have been mentioned above. This FIG. 4 represents schematically the equipment with only its essential elements shown for the purpose of understanding its operation, the conical mandrels 1 being represented approximately when the desired number of hollow fibers 3 has been wound around each one of them.

The apparatus according to FIG. 4 comprises a device for winding at least one hollow fiber 3d around means which make it possible to obtain an envelope 3c of polygonal cross-section with this fiber 3d. This device comprises a frame 21, which rotates around its central vertical axis, with spools 22 of hollow fibers 3d and conventional thread-guides (not shown). In order to simplify the drawing, the means of rotating this frame 21 are not shown.

Each spool 22 carries at least one hollow fiber 3d and can optionally carry several; in the latter case, the hollow fibers are advantageously in the form of torsades.

Figure 5:
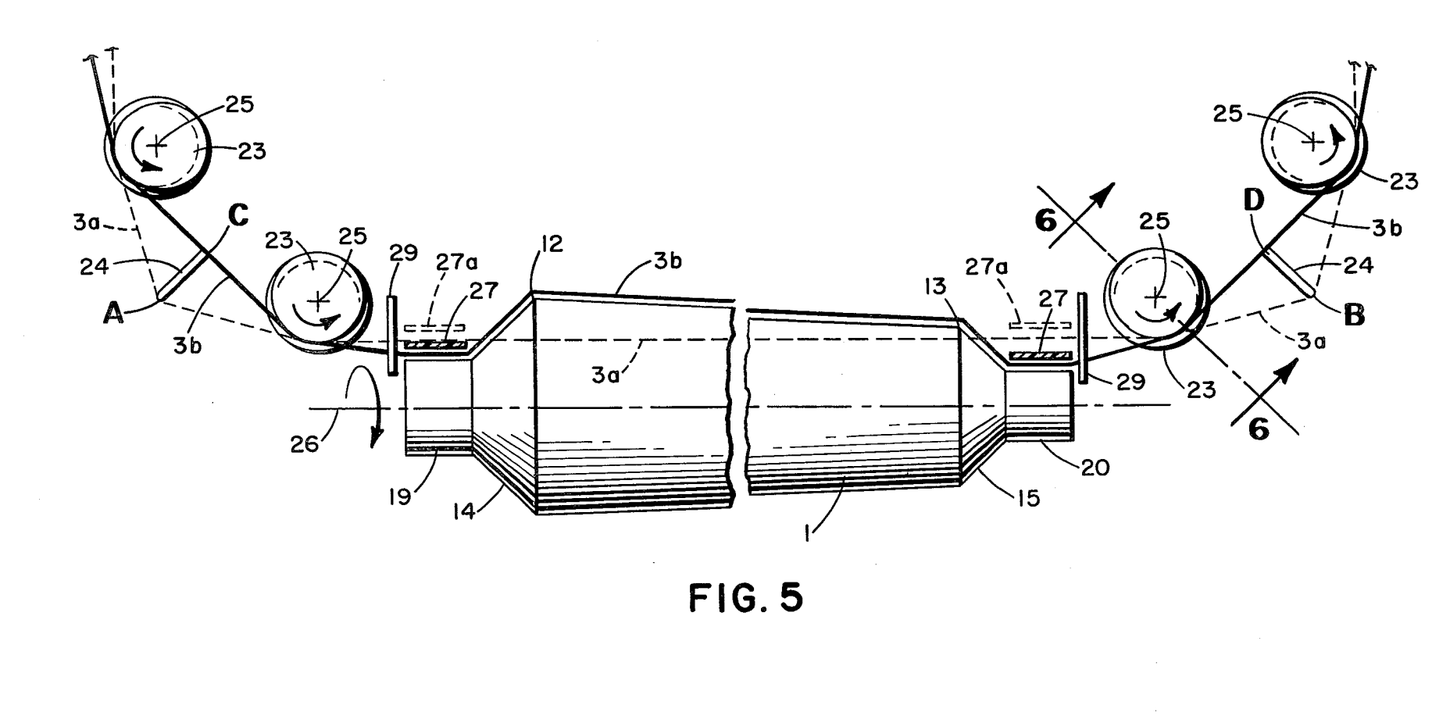
FIG. 5 is a partial top view of the equipment in FIG. 4.
Figure 6:
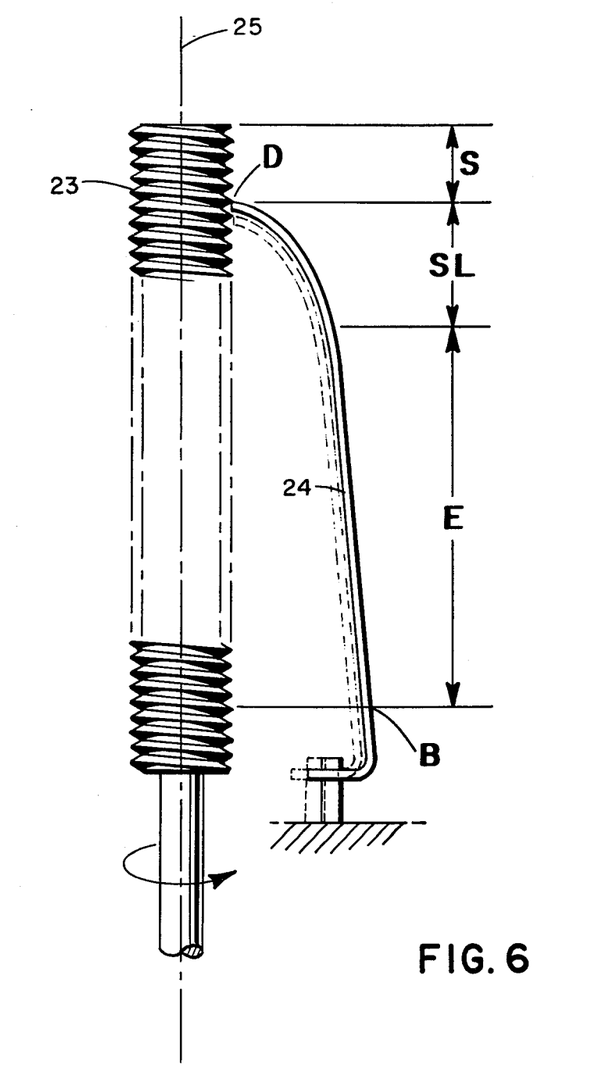
FIG. 6 is a cross-section along 6—6 in FIG. 5 and along 6—6 in FIG. 7.

The frame 21 is shown with four spools 22, but it may have only one. The means which make it possible to obtain an envelope of polygonal cross-section 3c with the fibers 3d comprise cylindrical rods 23, which are at least partially threaded, and are arranged near each end of the mandrel 1, and on the threaded part of which the hollow fibers are arranged by winding, using the frame 21. The hollow fibers 3d are also arranged on the extension ramps 24 of which further details will be given below, especially in the description of FIG. 6. These rods 23 can rotate about their own longitudinal axis 25, using conventional means for rotating same which are not shown. In the case of FIGS. 5 and 6, the rods 23 are represented as threaded along their whole length.

The equipment according to FIG. 4 comprises four mandrels 1, two threaded rods 23 between two consecutive mandrels 1, and a ramp 24 between two adjacent threaded screws. But the number of mandrels can be larger, for example, equal to six, and it can be smaller, for example, equal to three. When the number of mandrels is equal to two, they are advantageously arranged so that their axes are essentially parallel to each other. In the apparatus according to FIGS. 4 and 5, the axes 26 of the mandrels 1 are in the same plane, which is perpendicular to the axis of rotation of the frame 21, and for simplicity the means for causing the mandrels 1 to turn about their axis 26 have not been shown.

The equipment according to FIGS. 4 and 5 comprises means for holding the envelope 3c of hollow fibers before it is sectioned; these means are, for example, ribbons 27 or threads. These ribbons 27 are thin, and generally of thickness between 0.05 and 2 mm and preferably between 0.1 and 1 mm. The width of the ribbons is in general less than 7 cm and preferably less than 3 cm. These ribbons 27 can be made of synthetic material, such as polypropylene, polyamide or polyester, in the form of a film for example, or of natural material such as cotton for example. The ribbons 27 may be extruded, braided, knitted, woven or non-woven, and may have a large number of small holes. These ribbons 27 may be covered with adhesive material, at least over a part of their width, by passing them through troughs 28 containing conventional sizing agents, before they are wound around the ends 19 and 20 of the mandrel 1 and before securing the envelope of polygonal cross-section at these points.

The equipment according to FIGS. 4 and 5 comprises means 29 for sectioning the envelope of hollow fibers. These means of sectioning 29 are advantageously positioned such that the envelope of hollow fibers 3c is sectioned when it is held around the ends 19 and 20 of the mandrel by the ribbons 27. These means of sectioning 29 can, for example, consist of blades which are driven in a to-and-fro movement, of heated wires, or advantageously of rotating blades. These means of sectioning the envelope of fibers are situated near each end 19 and 20 of each mandrel.

FIG. 5 represents a partial top view, of no fixed scale and quite schematically, of the equipment in FIG. 4 at the beginning of the winding operation of the hollow fibers around a mandrel 1, the means of winding the fibers being omitted. FIG. 6 represents an extension ramp 24 and is a cross-section along 6—6 of FIG. 5, but for the sake of clarity in the drawing the hollow fibers of the polygonal envelope have not been shown. When the frame 21 rotates around its axis, the hollow fibers 3d, which come from the spools 22, settle on the threaded rods or screws 23, which are rotating about their axis 25, and on the extension ramps 24 in order to form the envelope of polygonal cross-section 3c. With reference to FIG. 6, each hollow fiber 3d settles at the point B on the ramp 24 and at the same time on the threaded screws 23 which are adjacent towards their lower part. As the threaded rods 23 are rotating so as to make it possible for the fibers to move upwardly, the fibers will initially travel the length E of the ramp 24. This part E of the ramp 24 has a very slight slope in relation to the axes 25 of the threaded screws 23 and this corresponds to the period during which the fibers slacken from their initial winding tension. While continuing their upward movement on the rods 23, the fibers will then travel the length SL of the ramp 24 which corresponds to the period during which the fibers come into contact with the mandrel 1 and become arranged around the latter with the aid of the ribbons 27 which become wound at the ends 19 and 20 of the said mandrel 1. After the ramp 24 has fulfilled its functions, the fiber leaves the ramp 24 and can continue its upward movement only on the threaded screws 23. The envelope of fibers is advantageously sectioned in the region corresponding to the length S of the threaded rods 23.

FIG. 5 shows more especially a top view of how a hollow fiber, which is a part of the hollow fiber envelope of polygonal cross-section, can change position from the time it is deposited by winding onto the ramps 24 and the threaded screws 23: fiber 3a is represented as a dotted line up to the time when it is arranged around the mandrel 1 and is now in contact only with the screws 23 before being sectioned by the sectioning means 29. In this last position, the fiber is represented as a continuous line 3b. As is clearly evident from this FIG. 5, the ramps 24 are designed and positioned in such a way that the length of the fiber in position 3a (between A and B), at the time of its deposition by winding onto the threaded screws 23 and the ramp 24, is essentially equal to the length of the fiber in position 3b (between C and D), after it has been placed around the mandrel 1 and on its ends 19 and 20 and has left the ramp 24. The dotted lines 27a schematically represent the position of the ribbons 27 at each end 19 and 20 of the mandrel 1 when the fibers have just been deposited by winding onto the ramps 24 and the threaded screws 23.

However, it should be noted, in the FIGS. 1 to 3 and 9 of the apparatus according to the present invention, that the hollow fibers 3 which are near the mandrel 1 are longer than the peripheral fibers near the inner wall 11 of the casing 6. For this purpose, it is advantageous to displace the ramps 24, during the winding of the fibers around the mandrels 1, so as to reduce the extensions of fibers in the envelope 3c of polygonal cross-section. FIG. 6 shows as a dotted line the direction in which the ramp 24 is progressively displaced during the production of a hollow fiber apparatus; the means which make it possible to displace the ramp are per se conventional and for simplicity are not shown.

The ramps which are mentioned in the foregoing description are easy to construct and can consist of a single rod, which can be easily shaped, for example a length of stainless steel of 3 mm diameter. Each ramp 24 is held in position by means which are not shown in FIG. 4.

The production of apparatuses according to the present invention with the equipment shown in FIGS. 4 to 6 is carried out in the following manner:

after passage through a glue-distributing trough 28, each ribbon 27 is attached to one end 19 or 20 of a mandrel 1, the end of each hollow fiber 3d, which is wound off from a spool 22, is attached to a fixed point on the apparatus after having passed this fiber 3d into the conventional thread-guide (not shown) of the spool, the mandrels 1, the frame 21, and the threaded rods 23 are caused to rotate about their respective axes and the sectioning means 29 are put into operation, when the envelope 3c of hollow fibers is in place around the mandrels and comes into contact with the sectioning means 29, hollow fibers 3 are thus obtained which are open at both ends, and the ribbons 27 are sectioned when the thickness (or the number) of hollow fibers 3 around the mandrels 1 is sufficient for the desired purpose.

After removal of the mandrel from the equipment, it then remains only to arrange the casing 6 around the fibers 3 which are held up by the mandrel 1 and the end cheek (or cheeks).

Numerous variants of the equipment described above and represented in FIGS. 4 to 6 will be apparent to those skilled in the art. Thus, the means for causing the envelope 3c, of polygonal cross-section, of hollow fibers to move can be screws which are threaded only in the region of deposition of the fibers 3d. The upward movement of the fibers of the envelope 3c into the non-threaded part of the rods 23 thus occurs by means of the thrust of the fibers arising from the threaded region of those rods. Each threaded rod or screw 23 can optionally be replaced (although this is not a preferred embodiment) by two adjacent elements the movement of which, in relation to each other, is analogous to the movement of the elements for the entraining of materials under and past the "presser foot" of a sewing machine.

In the equipment described above, the glue distributing troughs 28 can optionally be omitted, for it is advantageous, but not indispensable, that the ribbons 27 be previously covered with glue. Since the hollow fibers of the envelope 3c of the polygonal cross-section can be held by the ribbons 27 against the ends 19 and 20 of each mandrel, the absence of adhesive is not incompatible with the process, especially at the time of sectioning. For the production of the seal of the wall (or walls) 2 of the hollow fiber apparatus 3, it will be necessary only to continue the operation according to per se known injection techniques.

Figure 7:
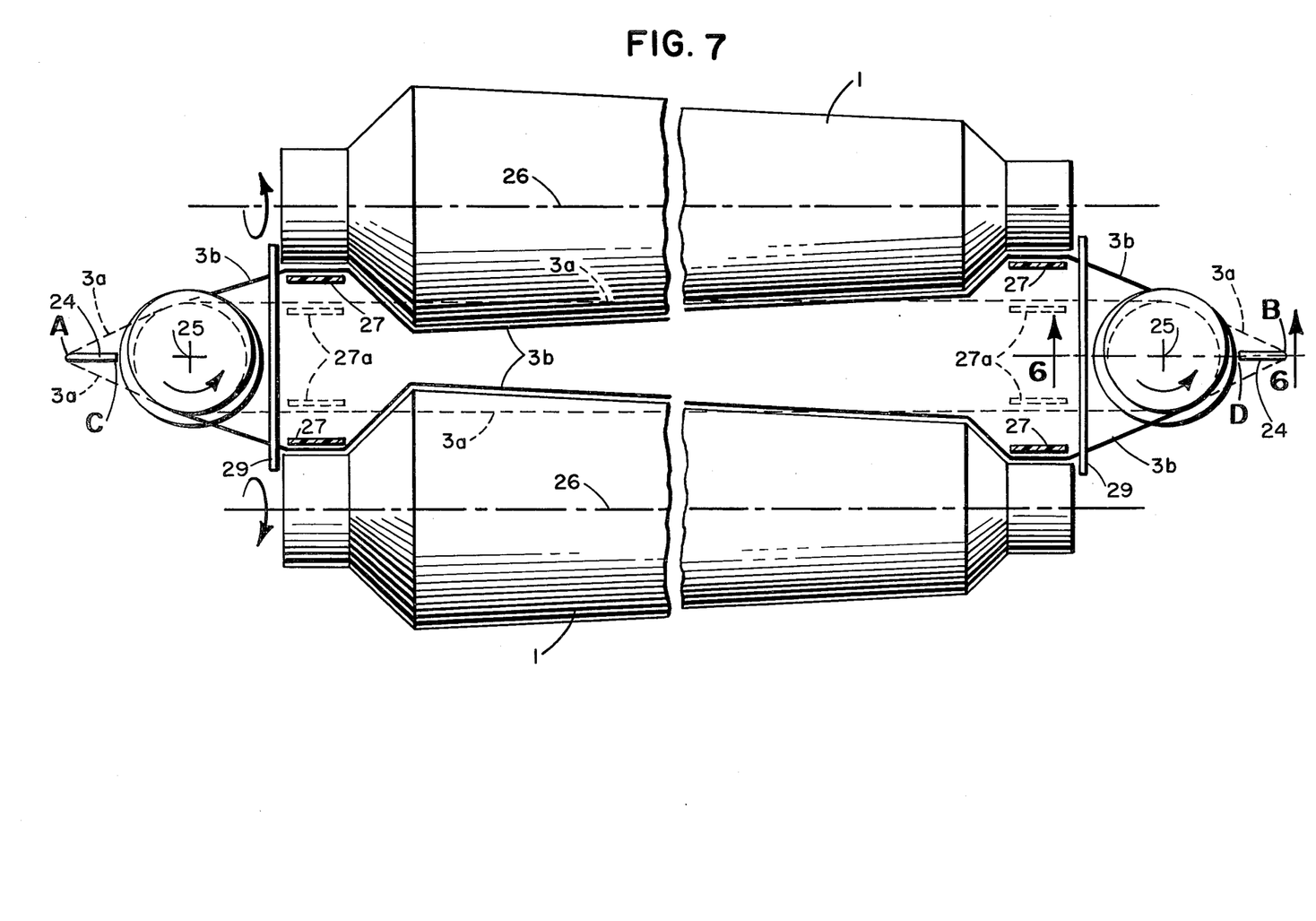
FIG. 7 is a top view of an embodiment of equipment for producing a hollow fiber apparatus according to the present invention.

Although the equipment described above comprises two threaded screws 23 between the ends of two successive mandrels 1, it is nevertheless possible to have only a single screw 23 between two consecutive mandrels. This is illustrated in FIG. 7. FIG. 7, as also FIG. 5, can be regarded as a partial top view (the frame 21 and the spools 22 being omitted) of the equipment shown in FIG. 4 at the beginning of the winding of the hollow fibers around the mandrels, the latter here being only 2 in number. The extension ramps 24, in this case, can advantageously be positioned, for example, in the plane which passes through the axes 25 of the screws 23, on each side of the equipment (see FIG. 7). FIG. 6 can be regarded as a partial cross-section along VI—VI of FIG. 7 (but the hollow fibers of the envelope of polygonal cross-section here are not shown) and all the comments given above for the description of FIGS. 5 and 6 can be similarly applied to FIG. 7. As for the equipment shown in FIGS. 4 and 5, conventional means (not shown) can be provided, for example, in order that the mandrels 1 shall move away regularly and progressively from the polygonal envelope of hollow fibers as the latter wind around the mandrel.

Figure 8:
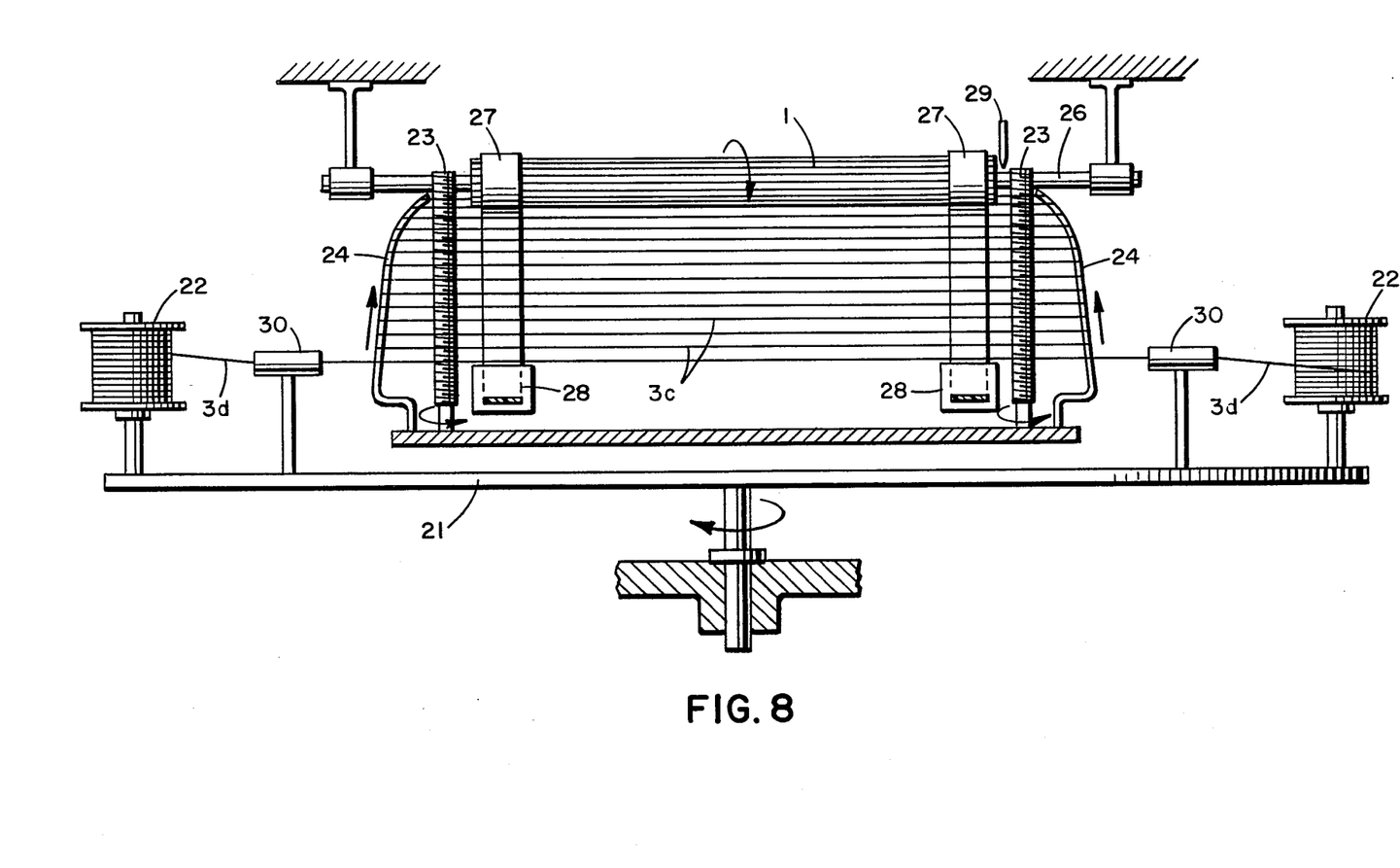
FIG. 8 is another embodiment of the equipment.

FIG. 8 represents equipment which is more especially suitable for the production of hollow fiber apparatuses according to FIG. 3 wherein the hollow fibers are disposed in the shape of a U at one of their end walls. In this embodiment, all the elements of the equipment previously described in connection with FIGS. 4 to 7 are found again, with only the thread-guides 30 being additionally represented. The hollow fibers 3d which come from the spools 22, after having passed through the thread-guides 30 are wound by means of the frame 21 around threaded screws 23 and ramps 24, whereupon a polygonal envelope 3c of hollow fibers is then obtained. By rotation of the threaded screws 23 this envelope moves forward in the direction of the arrows towards the mandrel 1 on the ends of which the ribbons 27 are being wound. Sectioning means 29 for the envelope 3c are provided only at one of the ends of the mandrel 1, insofar as it is desired to slice the fibers when the envelope 3c is being wound around the mandrel 1. It can be considered that FIG. 8 shows when the time is approaching when the number of fibers around the mandrel 1 is sufficient. The equipment shown in FIG. 8 comprises 2 ramps 24 which are essentially in the plane which passes through the axes of the threaded screws 23. However, this equipment may contain only one ramp 24. The equipment according to FIG. 8 can additionally contain extension ramps 24 on each side of the plane which passes through the axis of the threaded screws 23. As far as the ribbons 27 are concerned, they can be situated inside the polygonal envelope 3c, but optionally they can be situated outside this envelope.

As far as the hollow fiber apparatuses according to the present invention are concerned, it should be mentioned that the term "in the form of a truncated cone", which is used to define the mandrel and the inner wall of the casing, should be understood in the broadest sense, and so it should be understood that the mandrel and the inner wall of the casing are in the general shape of a truncated cone, given that conicity encompasses any surface which is generated by a moving line, which is not necessarily rigorously straight, and which passes through a fixed point and touches a closed curve. This line, which corresponds to the longitudinal profile of the part of the mandrel which is in the form of a truncated cone and to the inner wall of the casing, can thus, for example, be a slight curve and be slightly and regularly broken or undulating. This embodiment with a broken or undulating line can be advantageous in order to improve the turbulence of the fluid which circulates outside the hollow fibers.

What is claimed is:

1. Hollow fibre apparatus for the fractionation of fluid, especially useful as an artificial kidney, characterized in that it comprises:

a mandrel in the form of a truncated cone towards the ends of which two end walls are situated, which surround the mandrel and by which hollow fibres are held, the fibres extending from one end wall to the other, at least one of the end walls being sealed and traversed by the open ends of the hollow fibres, an outer casing of which the inner wall is in the form of a truncated cone at least along the greater part of is length near the hollow fibres, the latter being uniformly pressed against each other between the inner wall of the casing and the mandrel on the greater part of its length, means for intake and discharge for the fluid which circulates inside the hollow fibres, and means for the intake and discharge for the fluid which circulates on the outer wall of the fibres.

2. Apparatus according to claim 1, characterized in that it comprises a leak-proof end wall near each end of the mandrel and that the hollow fibers are in the form of torsades which are placed next to each other, each hollow fiber traversing each end wall and being open at its two ends.

3. Apparatus according to claim 1, characterized in that the mandrel is in the form of a truncated cone along a length L which corresponds to the greater part of its length between the two end walls.

4. Apparatus according to claim 3, characterized in that the mandrel is cylindrical at the region where it is surrounded by the end walls and in that the joining of the ends of the length L, which is in the form of a truncated cone, of the mandrel to the cylindrical parts of the ends of the mandrel is accompanied by a sharp decrease in the cross-section of the mandrel at these points.

5. Apparatus according to claim 1, characterized in that the inner wall of the casing is in the form of a truncated cone essentially along its whole length.

6. Apparatus according to claim 1, characterized in that the conicities of the mandrel and of the inner wall of the casing are slightly different.

7. Apparatus according to claim 3, characterized in that the conicities of the mandrel in its part L and of the inner wall of the casing are such that the surface of the cross-section between these two elements is essentially constant along the length L.

8. Apparatus according to claim 1, characterized in that the casing includes openings which are distributed on its periphery and through which glue or a plastic material is injected in order to fix the end walls to the casing.

9. Apparatus according to claim 1, characterized in that the ends of the mandrel surrounded by the end walls, have cross-sections which are different from each other.

10. Apparatus according to claim 9, characterized in that the end of the mandrel which has the larger cross-section has a smaller cross-section than the smaller cross-section of the length L, in the form of a truncated cone, of the mandrel.

11. Apparatus according to claim 1, characterized in that the mandrel is in the form of a double truncated cone at least along a length L which corresponds to the greater part of its length between the end walls and in that the casing comprises two elements of which the inner wall of each is in the form of a truncated cone at least for the greater part of its length which is opposite the corresponding part, which is in the form of a truncated cone, of the mandrel.

* * * * *